United States Patent [19]
Lowenschuss et al.

[11] 4,280,219
[45] Jul. 21, 1981

[54] DIGITAL MEMORY SYSTEM

[75] Inventors: Oscar Lowenschuss, Goleta; Bruce E. Gordon, Santa Barbara, both of Calif.

[73] Assignee: Raytheon Company, Lexington, Mass.

[21] Appl. No.: 77,231

[22] Filed: Sep. 19, 1979

[51] Int. Cl.$^3$ .............................................. H04B 7/15
[52] U.S. Cl. ........................................ 375/4; 375/76; 455/18; 365/80; 365/129
[58] Field of Search .......................... 375/3, 4, 58, 76; 365/80, 129; 307/221, 354, 356, 362, 363; 364/700, 701; 343/6.8 R, 6.8 LC; 340/146.3 Y; 328/28, 31, 42, 51, 53, 58, 164; 179/13 E, 13 EA; 178/70 R, 70 TS

[56] References Cited

U.S. PATENT DOCUMENTS

| | | | |
|---|---|---|---|
| 2,477,585 | 8/1949 | Dodington | 328/164 |
| 3,368,038 | 2/1968 | Ringlehaan | 375/4 |
| 3,502,906 | 3/1970 | Aulhorn et al. | 328/164 |
| 3,777,268 | 12/1973 | Cleobury et al. | 375/76 |
| 4,015,144 | 3/1977 | Brouckaert | 328/164 |

*Primary Examiner*—Benedict V. Safourek
*Attorney, Agent, or Firm*—Richard M. Sharkansky; Joseph D. Pannone

[57] ABSTRACT

A digital memory system adapted to store samples of a received radio frequency signal and enable retransmission of a radio frequency signal from such stored samples, such retransmitted radio frequency signal having a frequency related to the frequency of the received radio frequency signal. The received signal is heterodyned to a periodic sinusoid video frequency signal having a predetermined average level. A sequence of one-bit logical signals representative of the amplitude of the video signal relative to a predetermined level other than the predetermined average level is stored. The stored samples are returned and converted to a radio frequency signal having a frequency of the received signal. By using a non-average level as the threshold voltage, the spectrum of the signal retrieved from the memory will have reduced harmonic components relative to the fundamental frequency component.

3 Claims, 9 Drawing Figures

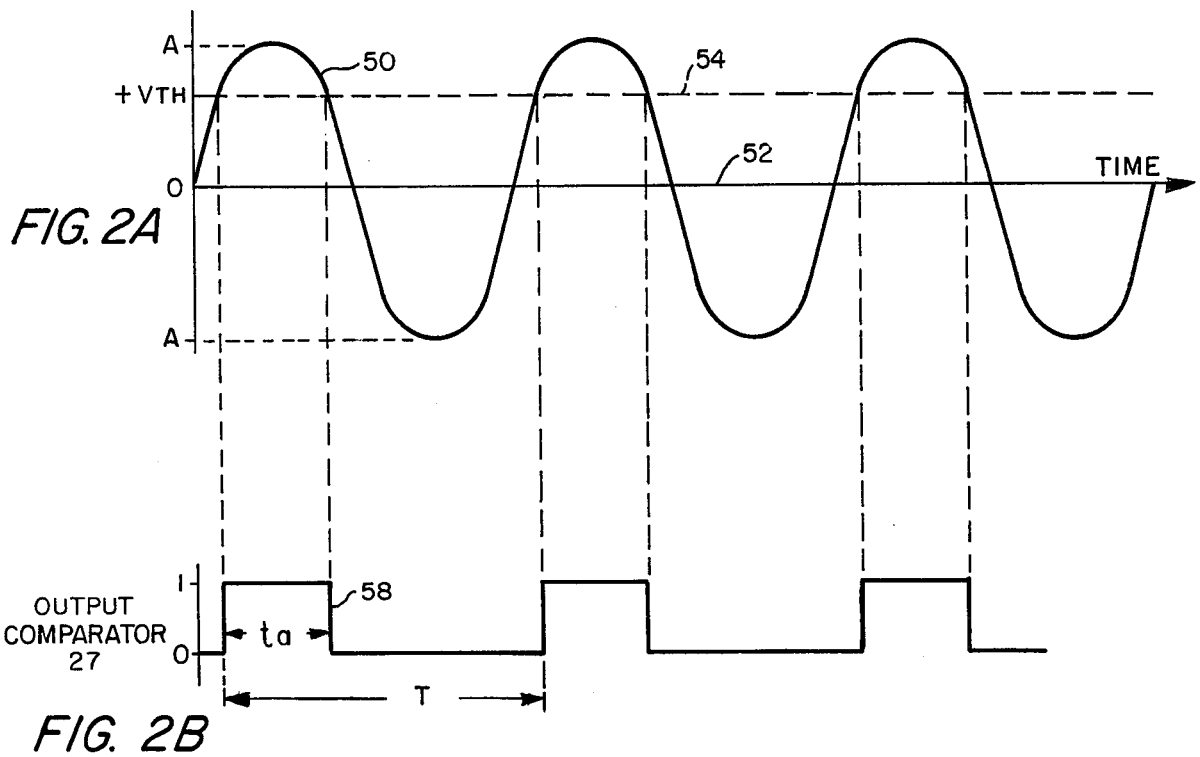
FIG. 2A
FIG. 2B
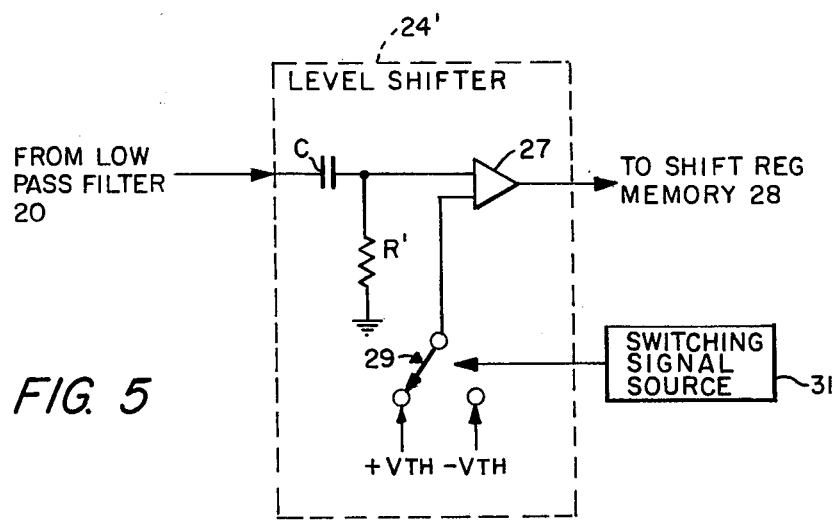
FIG. 5

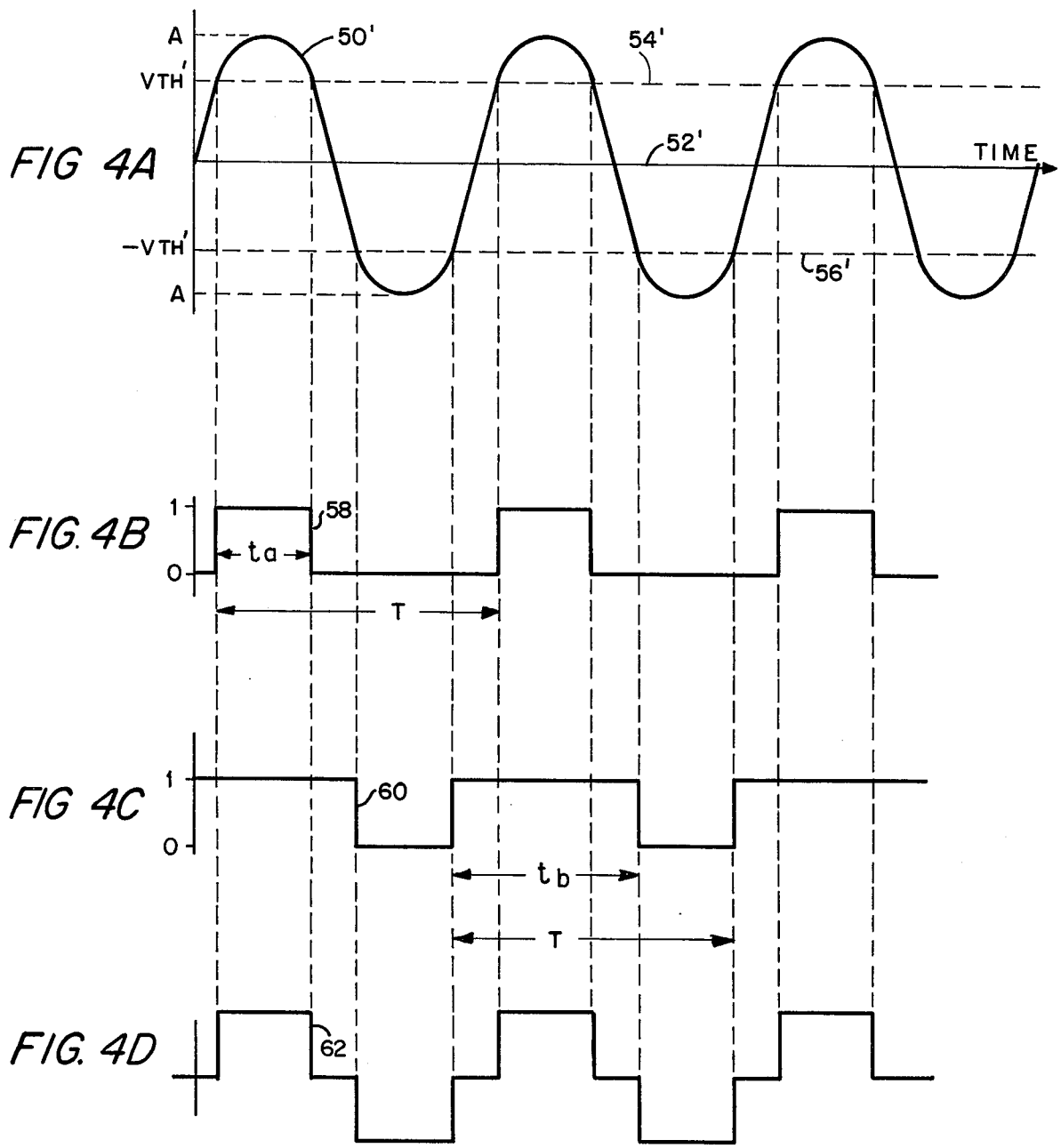

DIGITAL MEMORY SYSTEM

BACKGROUND OF THE INVENTION

This invention relates generally to digital memory systems and more particularly to digital memory systems which are adapted to store radio frequency signals and to enable subsequent retransmission of such signals.

As is known in the art, it is frequently desired to store a received radio frequency signal and later retransmit such signal. In one such system the received radio frequency signal is periodically sampled at or above the Nyquist frequency, each sample is next converted into a corresponding digital word and each digital word is then stored in a digital memory. When it is desired to retransmit, the stored digital words are sequentially read from the memory in the sequence in which they were stored and such digital words are converted into corresponding voltages to produce a radio frequency signal which is amplified and retransmitted.

With such arrangement the degree to which the retransmitted radio frequency signal resembles the received radio frequency signal is related, inter alia, to the degree of quantization of the samples, i.e. the number of bits in each digital word. On the other hand, the cost, weight and size of the memory system increases as the degree of quantization increases. In particular, as the number of bits representing each sample is reduced the retransmitted radio frequency signal will, as a result of the quantization error, include, in addition to a radio frequency signal having the frequency of the received signal, unwanted harmonics or spurious signals which distort and cause undesirable responses in the received signal which may interfere with the intended communication.

SUMMARY OF THE INVENTION

With this background of the invention in mind it is an object of this invention to provide an improved digital memory system.

It is another object of this invention to provide an improved digital memory system adapted to store radio frequency signals and enable subsequent transmission of such signals.

It is still another object of this invention to provide an improved digital memory system wherein samples of a received radio frequency signal are converted into corresponding digital words, each one being represented by a minimum number of bits, such digital words being stored and later retrieved to produce a replica of the received radio frequency signal with minimum harmonics or spurious components.

These and other objects of the invention are attained generally by providing a digital memory system adapted to store samples of a received radio frequency signal and enable retransmission of a radio frequency signal from such stored samples, such retransmitted radio frequency signal having a frequency related to the frequency of the received radio frequency signal, such system comprising: Means for heterodyning the received signal to a periodic video frequency signal; means for storing a sequence of logical signals having a first state representative of the amplitude of such video frequency signal when the amplitude of such video frequency signal is greater than a predetermined level and having a second state when the amplitude of such video frequency signal is less than the predetermined level, the amplitude of the video frequency signal being less than the predetermined level for a period of time other than half the period of the video frequency signal; and means for converting the sequence of stored logical signals to a radio frequency signal having a frequency related to the frequency of the received radio frequency signal.

BRIEF DESCRIPTION OF THE DRAWINGS

The foregoing features of this invention as well as the invention itself may be more fully understood from the following detailed description read together with the accompanying drawings, in which:

FIGS. 2A and 2B are curves useful in understanding the radio frequency signal receiver/transmitter system shown in FIG. 1;

FIGS. 4A-4D are curves useful in understanding the radio frequency signal receiver/transmitter system shown in FIG. 3; and FIG. 5 is an alternative embodiment of a level shifter adapted for use in the radio frequency signal receiver/transmitter system of FIG. 1.

DESCRIPTION OF THE PREFERRED EMBODIMENTS

Figure 1:
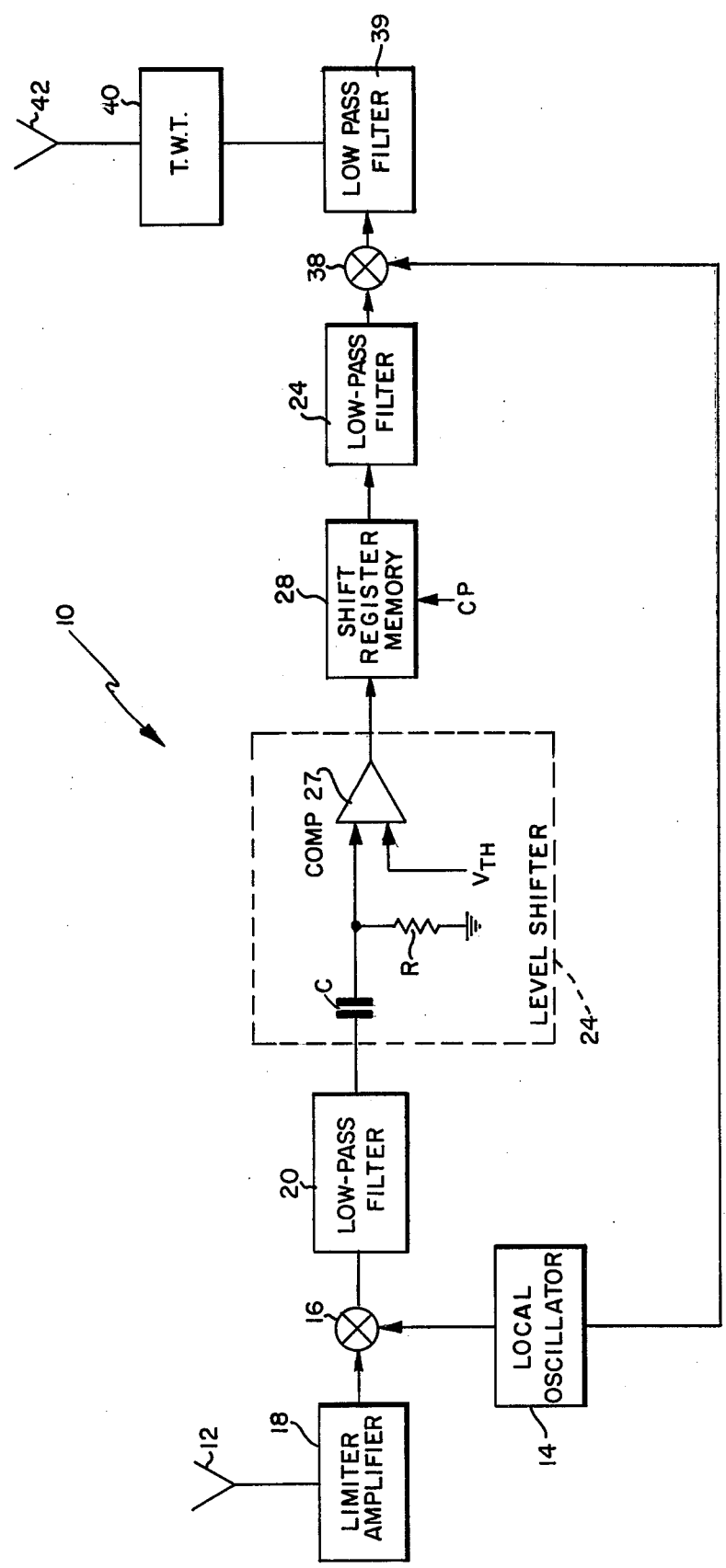
FIG. 1 is a block diagram of a radio frequency signal receiver/transmitter system according to the invention.

Referring now to FIG. 1, a radio frequency signal receiver/transmitter system 10 adapted to store radio frequency signals and to enable subsequent retransmission of such signals is shown. Such system 10 includes a receiving antenna 12 of any conventional design to receive radio frequency signals. The received radio frequency signals are amplified and limited by a conventional limiter-amplifier 18 so that the signals presented to the succeeding elements of the system 10 have a constant maximum-minimum amplitude variation, thereby normalizing such signals for reasons to become apparent hereinafter. The thus limited signals are then heterodyned to a suitable video frequency signal, $f_1$, by a local oscillator 14 and mixer 16. The beat frequency signals are then passed to a low pass filter 20, here having a bandwidth from 0 to 125 MHz, to reject higher order harmonics and intermodulation signals produced by both the limiting and the mixing process. It follows, then, that a received signal having a frequency $f_r$ within the bandwidth of the system 10 will pass through the low pass filter 20 with a frequency $f_1 = f_r - f_{LO}$ (where $f_{LO}$ is the frequency of the local oscillator 14) and all harmonics produced by the mixing process will be substantially rejected by the low pass filter 20.

The video frequency signal is then fed to a level shifter 24, as shown. The level shifter 24 includes an a-c coupling capacitor C, a resistor R and a comparator 27 coupled to the resistor R and to the capacitor C, as shown. Also coupled to the comparator 27 is a suitable threshold voltage source $V_{TH}$, as shown. In order to select the level shift provided by the level shifter 24, reference is made to FIG. 2A which shows the video frequency signal, here a sinusoidal signal labeled 50, which passes through low pass filter 20 to the level shifter 24. Such signal 50 has zero D.C. or average level indicated by the line 52. The threshold voltage $V_{TH}$ fed to the comparator 27 is selected such that when the sinusoidal signal 50 (FIG. 2A) has an amplitude greater than or equal to $V_{TH}$ (i.e., represented by dotted line 54) a logical 1 is produced by comparator 27 and if the level of the sinusoidal signal 50 (FIG. 2A) is less than $V_{TH}$ a logical 0 is produced. The output of comparator 27 (FIG. 1) for a threshold voltage of $+V_{TH}$ is shown in FIG. 2B as a rectangular wave signal 58. It is noted that the video frequency signal 50 may be represented as:

$$A \sin 2\pi f_1 t \qquad (1)$$

where $f_1$ is the frequency of such signal and A is the normalized amplitude of the video frequency signal 50. The signal produced by comparator 27 is a rectangular wave signal which is fed to a shift register memory 28, as shown. In response to clock pulses fed to line cp from a conventional clock means, not shown, the memory 28 stores a sequence of samples of the rectangular wave signal fed thereto. Here the clock pulses are fed to line cp at a rate of 250 MHz; that is, at a rate twice the highest frequency of the signal passed by low pass filter 20.

The Fourier coefficients for the rectangular wave signal 58 shown in FIG. 2B may be expressed as:

$$C_{na} = 2t_a/T \frac{|\sin(n\pi t_a/T)|}{n\pi t_a/T} \qquad \text{Eq. (2)}$$

where: $t_a$ is the pulse width and T is the pulse repetition frequency, $2\pi/f_1$.

It is noted that here, for reasons to be described hereinafter, the value of the threshold voltage $V_{TH}$ is adjusted so that, for a rectangular wave signal, such as signal 58 (FIG. 2B), the pulse width $t_a$ is less than half the period T. That is, to put it another way, memory 28 stores a sequence of logical signals having a first logical state (i.e., logical 1) when the amplitude of the sinusoidal radio frequency signal 50 (FIG. 2A) is greater than a predetermined level (i.e. here $+V_{TH}$) and such memory 28 stores a logical signal having a second logical state (i.e., logical 0) when the level of the sinusoidal signal 50 is less than the predetermined level; however, here, for reasons to become apparent, the amplitude of the sinusoidal signal 50 varies asymetrically about the predetermined level $V_{TH}$; that is the amplitude of the level of video frequency signal 50 is less than the predetermined level $V_{TH}$ for an interval of time other than half the period, T. Consequently, the output of comparator 27 is a rectangular wave signal having a pulse width $t_a$ other than half the period, T.

In order to understand the advantage of selecting a threshold level $+V_{TH}$ such that the rectangular wave signal 58 produced at the output of comparator 27 has a ratio of $t_a/T$ other than one-half, it may be helpful to compare the Fourier coefficients of a rectangular wave signal having a pulse width half of the period of such signal (i.e. a ratio $t_a/T=\frac{1}{2}$) with a signal having a ratio $t_a/t\neq\frac{1}{2}$. From Equation (2), it is noted that for $t_a=T/2$, the Fourier coefficients may be expressed as:

$$C_n = |\sin(n\pi/2)/(n\pi/2)| \qquad (3)$$

Further, the Fourier coefficient for the fundamental frequency component $C_1$ is $2/\pi$ and the coefficient for the next highest harmonic, here the third harmonic $C_3$, is $\frac{2}{3}\pi$. (It is also noted that, from Eq. (3), there are only odd harmonics, i.e. n = 1, 3, 5, 7, etc., whereas, from Eq. (2) for a rectangular wave signal having $t_a/T$ other than $\frac{1}{2}$ there are both odd and even harmonics.) Considering for example the case where $t_a/T$ is other than $\frac{1}{2}$, as, for example, $t_a/T=151/360$ (where the magnitudes of the second and third harmonics are equal to each other). From Eq. (2), the fundamental frequency component $C_{1a}$ is $1.94/\pi$. The second harmonic has a coefficient $C_{2a}=0.485/\pi$ and the third harmonic $C_{3a}$ is also $0.485/\pi$. It is noted that the ratio of the fundamental component to the next highest harmonic (i.e., $C_1/C_3$) for the rectangular wave signal having $t_a/T=\frac{1}{2}$ is 3, whereas for the rectangular wave signal having $t_a/T=151/360$, the ratio $C_{1a}/C_{2a}$ is increased to 4. Such increase has an advantage of producing an output waveform from the system 10 (FIG. 1) having a frequency spectrum with a fundamental frequency component which is more prominent than the harmonic frequency components, thereby making detection of the fundamental frequency signal, for example, easier and more effective. In summary then, the rectangular wave signal having a ratio $t_a/T=\frac{1}{2}$ has a frequency spectrum that contains only odd harmonics; the even harmonics of a rectangular wave signal being all equal to zero, and the D.C. component also being equal to zero. On the other hand, the rectangular wave signal having a pulse width $t_a$ which is not equal to half the period, T, of the signal has both odd and even harmonics, and a D.C. component as well. The relative time duration of pulse width $t_a$ to the period T determines the relative amplitude of the harmonics. With the rectangular wave signal having $t_a/T\neq\frac{1}{2}$, the ratio of the magnitude of the fundamental frequency component to the magnitude of the next higher magnitude harmonic is greater than for a rectangular wave signal having a $t_a/T=\frac{1}{2}$. Therefore, with the former rectangular wave signal the fundamental frequency component has greater prominence than the other frequency components in its frequency spectrum as compared to the latter rectangular wave signal. A little thought will make it apparent, therefore, that greater prominance of the fundamental frequency $f_1$ compared to the harmonics of a signal is enhanced by adjusting or shifting the threshold level $=V_{TH}$ to a value other than zero. For example, with the threshold level $V_{TH}$ selected at 0.25 A, the second and third harmonics are of equal amplitude (i.e., producing a rectangular wave signal with $t_a/T=151/360$) and the magnitude of the third harmonic is reduced by approximately 2.51 decibels compared to the magnitude of the third harmonic of a rectangular wave signal having $t_a/T=\frac{1}{2}$. While a second harmonic has been added, the magnitude of the second harmonic is here equal to that of the third harmonic and both the second and third harmonics are about 12 decibels down below the fundamental; and all of the higher order harmonics are of even lower magnitude. Therefore, the ratio of the magnitude of the fundamental frequency to the magnitude of the next higher magnitude harmonic is increased and the prominence of the fundamental frequency relative to the other frequency components of the frequency spectrum is increased using such a threshold level.

Referring again to FIG. 1, after the shift register memory 28 is full the logical signals stored therein are clocked out in response to the clock pulses on line cp, here at the 250 MHz rate. The output of memory 28 is fed to a low pass filter 24, here having a bandpass from 0 to 125 MHz. The filtered signals are then heterodyned up in frequency by the local oscillator 14 and mixer 38 to a proper radio frequency signal, here with the fundamental frequency component being converted to the same frequency, $f_r$ as the received signal. The signals produced by mixer 38 are passed to a low pass filter 35 and are then amplified and retransmitted by a conventional traveling wave tube (TWT) 40 and antenna 42, as shown. It is noted that such transmitted signal will here have as a fundamental frequency component the frequency of the received radio frequency signal. Further, because only a one bit storage was provided for each sample by the shift register memory 28, harmonics are produced which are also transmitted. However, as discussed above, because the threshold voltage $V_{TH}$ fed to comparator 27 was selected as described to enable storage in memory 28 of a sequence of samples of a rectangular wave signal having $t_a/T \neq \frac{1}{2}$ the magnitude of the fundamental frequency of the transmitted signal, $f_r$, will be more prominent than the harmonics than if a sequence of samples of a rectangular wave signal having $t_a/T = \frac{1}{2}$ had been stored in memory 28.

Figure 3:
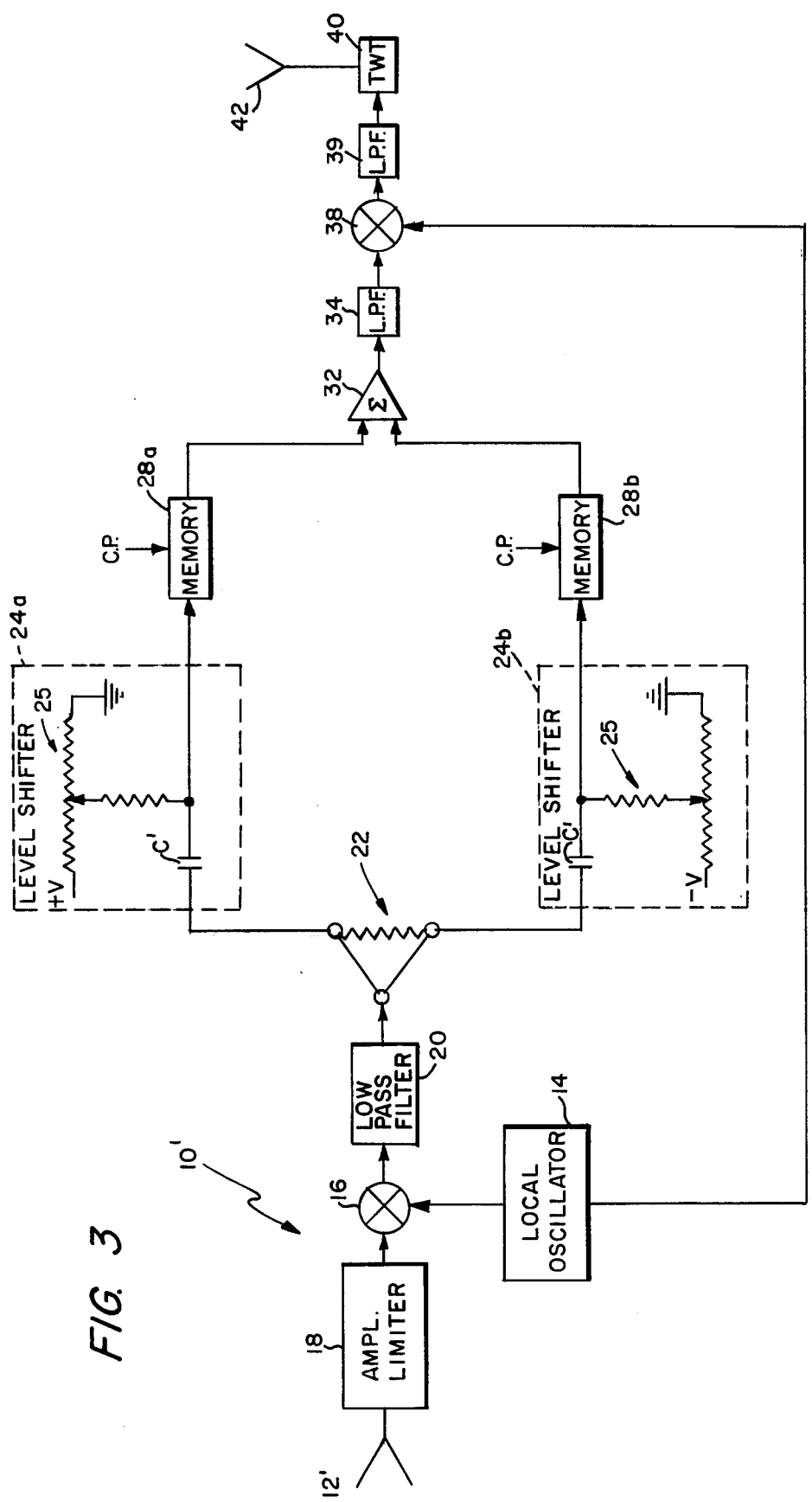
FIG. 3 is a block diagram of an alternate embodiment of a radio frequency receiver/transmitter system according to the invention.

Referring now to FIG. 3, a radio frequency signal receiver/transmitter system 10′ adapted to store radio frequency signals and to enable subsequent retransmission of such signals is shown. Such system 10′ includes a receiving antenna 12′ of any conventional design to receive radio frequency signals. The received radio frequency signals are amplified and limited by a conventional limiter amplifier 18 as described in connection with FIG. 1. The thus limited signals are heterodyned to a suitable intermediate frequency by a local oscillator 14 and mixer 16. The beat frequency signals are then passed to a low pass filter 20, here having a bandwidth from 0 to 125 MHz, to reject higher order harmonics and intermodulation signals produced in the limiting and mixing process. It follows then that a received signal having a frequency within the bandwidth of the system 10′ will pass through the low pass filter 20 and all harmonics produced by the mixing process will be substantially rejected by the low pass filter 20. The radio frequency signal passed by the low pass filter 20 is fed to a 2:1 power divider 22, as shown, to separate such signal into two channels, as shown. The pair of signals is fed to level shifters 24a, 24b, as shown. The signals in the upper channel are fed to a level shifter 24a, while the signals in the lower channel are fed to a level shifter 24b, as shown. Level shifters 24a, 24b are similar in construction and each includes an a-c coupling capacitor C′ coupled to the outputs of the power divider and a resistor voltage divider or potentiometer 25 coupled to the capacitor C′, as shown. A voltage source $+V$ is fed to potentiometer 25′ of level shifter 24a and a voltage source $-V$ is fed to potentiometer 25 of level shifter 24b, as shown.

In order to select the level shifts provided by the level shifters 24a, 24b, reference is made to FIG. 4A which shows the sinusoidal video frequency signal, labeled 50′, which passes through low pass filter 20 and 2:1 power divider to the upper and lower channels, i.e., to level shifter 24a and level shifter 24b. Such signal 50′ has a zero D.C. or average level 52′. The voltage sources $+V$, $-V$ and potentiometer 25 of level shifter 24a, 24b are selected such that the switching threshold of shift register memory 28a corresponds with a level $+V'_{TH}$ (indicated by dotted line 54′ in FIG. 4A) and the switching threshold of shift register 28b corresponds with a level $-V'_{TH}$ (indicated by dotted line 56′ in FIG. 4A) where $|1 + V'_{TH}| = |1 - V'_{TH}|$. It is noted that, as above, the signal 50′ may be represented as $$A \sin 2\pi f_1 t \quad (4)$$

The D.C. level shifted signals are fed to a pair of memories 28a, 28b, respectively, as shown (here conventional shift registers). Each one of the memories 28a, 28b is identical in construction and, in response to clock pulses fed to line cp, store samples of the signals fed thereto. Here the clock pulses are fed to line cp at a rate of 250 MHz; that is, at a rate twice the highest frequency of the signal passed by low pass filter 20. If the level of the signal fed to such memories 28a, 28b is greater than the switching threshold of such memories at the time of the leading edge of the clock pulse on line cp, a logical 1 becomes stored in the first stage of such memories 28a, 28b, and if the level of the signal fed to the memories 28a, 28b is less than (or equal to) such switching threshold at the time the leading edge of the clock pulse on line cp, a logical 0 is stored in the first stage of the shift registers. Further, while such memories 28a, 28b have the same threshold levels the level shifter 24a shifts the D.C. level of the signal fed thereto differently from that of the level shifter 24b so that the sequence of logical signals stored in the memories 28a, 28b in response to the same clock pulses on line cp will be different. In particular, because the sinusoidal signal 50′ (FIG. 4A) is, after being separated into a pair of channels, stored as a series of logical signals in shift register memories 28a, 28b, such signal 50′ may be considered as being separated into a pair of rectangular wave signals 58, 60 shown in FIGS. 4B and 4C, respectively, having two amplitude levels, or logical states: a logical 0 state (or low) or a logical 1 state (or high), as shown, and the shift registers 28a, 28b store samples of such rectangular waves in response to the clock pulses. The Fourier coefficients for the signal 58 shown in FIG. 4B may be expressed as in Eq. (2). Likewise, the Fourier coefficients for the signal 60 shown in FIG. 2C may be represented as in $$C_{n_b} = 2t_b/T | \sin (n\pi t_b/T)/(n\pi t_b/T) | \quad (5)$$

where $t_b$ is the pulse width of the rectangular wave signal 60 since $|1 + V'_{TH}| = |1 - V'_{TH}|$, $t_a + t_b = T$. When the signals read from the memories 28a, 28b in response to the clock pulses cp are summed in summing amplifier 32 (FIG. 3), a composite signal 62 (FIG. 4D) is formed and the Fourier coefficients of such composite signal 62 may be represented as:

$$\begin{aligned}
C_{n_c} &= C_{n_a} + C_{n_b} \\
&= 2[(t_a/T) |\sin (n\pi t_a/T)/(n\pi t_a/T)| \\
&\quad + (t_b/T) |\sin(n\pi t_b/T)/(n\pi t_b/T)|]
\end{aligned} \quad \text{Eq. (6)}$$

Since $t_b = T - t_a$, $$C_{n_c} = \frac{2[\sin(n\pi t_a/T) + \sin(n\pi(1 - t_a/T))]}{n\pi} \quad \text{Eq. (7)}$$

$$= (2/n\pi) [\sin(n\pi t_a/T) + \cos(n\pi t_a/T)\sin(n\pi) - \cos n\pi \sin(n\pi t_a/T)] \quad \text{Eq. (8)}$$

Since $\sin n\pi = 0$ for all $n$ and $\cos n\pi = (-1)^n$, Eq. (8) becomes $$C_{n_c} = 2/n\pi[(1 - (-1)^n) \sin (n \pi t_a/T)] \quad \text{Eq. (9)}$$

$$= 4 |\sin(n\pi t_a/T)/n\pi| \quad \text{for odd } n$$

$$= 0 \text{ for even } n \quad \text{Eq. (10)}$$

Because the composite signal 62 contains no even-order harmonics and because the amplitude of the harmonics falls as $1/n$, the highest harmonic is the third. From Eq. (10) it follows that if $t_a/T = \frac{1}{3}$, then $\sin \pi = 0$ and the third harmonic amplitude is zero. The harmonic amplitudes in dB below the fundamental are as follows:

| HARMONIC | 3 | 5 | 7 | 9 | 11 | 13 | 15 |
|---|---|---|---|---|---|---|---|
| AMPLITUDE | $-\infty$ | $-13.98$ | $-16.9$ | $-\infty$ | $-20.8$ | $-22.3$ | $-\infty$ |

It is noted that if it is desired to reduce the amplitude of the fifth and seventh harmonic such that both are essentially equal, and permitting a small amount of third harmonic, if $t_a/T=1/2.86$, the following harmonics are obtained:

| HARMONIC | 3 | 5 | 7 | 9 | 11 | 13 |
|---|---|---|---|---|---|---|
| AMPLITUDE | $-24.65$ | $-15.99$ | $-16.0$ | $-24.9$ | $-26.7$ | $-21.4$ |

Thus, the "tuning" of $t_a/T$ to 1/2.86 instead of ⅓ has lowered the peak harmonic (the fifth) by 2.01 dB at the cost of some third harmonic.

The effect of "level shifting" in the system described in connection with FIG. 3 may be viewed as follows: The upper channel is biased by level shifter 24a such that the even harmonics have one phase and the lower channel is biased by level shifter 24b so that the even harmonics have the opposite phase. When these are summed together in the summing amplifier 32 the even harmonics will cancel. However, the odd harmonics produced in this process will all have the same phase and will therefore add. As a result of proper adjustment of the level shifters 24a, 24b, all the even harmonics will be reduced to zero and a doubling in the amplitude of all the odd harmonics will occur. If the level shifters 24a, 24b are now adjusted so that the third harmonic is small or zero, then the net result will be that the output will have no effective third harmonic and no even harmonics, but will have an increased fifth harmonic. Due to the fact that the fifth harmonic has an amplitude considerably lower than the rest of the harmonics, the effect of the system shown in FIG. 3 is still a net reduction in the peak harmonic amplitude.

After the shift register memories 28a, 28b (FIG. 3) are full the logical signals stored therein are then clocked out in response to the clock pulses on line cp, here at the 250 MHz rate. The signals clocked out of such shift register memories 28a, 28b are combined in a conventional summing amplifier 32, as shown. The output of the summing amplifier 32 is fed to a low pass filter 34, here having a bandpass from 0 to 125 MHz. The filtered signals are then heterodyned up in frequency by the local oscillator 14 and mixer 38 to a proper radio frequency signal, here with the fundamental frequency component, $f_1$, being converted to the same frequency, $f_r$, as the received signal, and, after filtering by low pass filter 39, are passed to traveling wave tube (TWT) amplifier 40 and antenna 42 for amplification and retransmission, as shown.

Referring now to FIG. 5, an alternative embodiment of the invention is shown. Here level shifter 24 of system 10 (FIG. 1) is replaced with level shifter 24'. Here level shifter 24' is fed alternatively from a $+V'_{TH}$ voltage source and a $-V'_{TH}$ voltage source through switch 29 in response to switching signals fed to such switch 29 from any suitable clock switching signal source 31, as shown. With such arrangement the $+V'_{TH}$ level and $-V'_{TH}$ level are alternatively fed to comparator 27, as shown. The effect of the alternative switching between the $+V'_{TH}$ supply and the $-V'_{TH}$ supply is to reduce the amplitude of undesired harmonics as described in connection with FIG. 3. That is, where here a single channel is used the time multiplexing effect produced by switching alternatively between the $+V'_{TH}$ and the $-V'_{TH}$ supplies produces results similar to that produced by the two channel system 10' in FIG. 3 if the bandwidth of a receiver (not shown) of the retransmitted signal is narrower than the rate at which the switching signals from source 31 are fed to switch 31, i.e. the rate at which switch 29 (FIG. 5) switches between the $+V'_{TH}$ and $-V'_{TH}$ supplies.

Having described a preferred embodiment of this invention, it is now evident that other embodiments incorporating these concepts may be used. It is felt, therefore, that this invention should not be restricted to the disclosed embodiments, but rather should be limited only by the spirit and scope of the appended claims.

What is claimed is:

1. A digital memory system adapted to store samples of a received radio frequency signal and enable retransmission of a radio frequency signal from such stored samples, such retransmitted radio frequency signal having a frequency related to the frequency of the received radio frequency signal, such system comprising:
    (a) means for heterodyning the received signal to a periodic video frequency signal having a predetermined average level;
    (b) means, responsive to the periodic video frequency signal for producing a second periodic signal having an amplitude periodically greater than the predetermined level of the video frequency signal for periods of time different from half the period of the video frequency signal;
    (c) means for storing a sequence of logical signals having a first state representative of the amplitude of such second periodic signal when the amplitude of such second periodic signal is less than the predetermined level and having a second state when the amplitude of such second periodic signal is less than the predetermined level; and
    (d) means for converting the sequence of stored logical signals to a radio frequency signal having a frequency related to the frequency of the received radio frequency signal.

2. A digital memory system comprising:
    (a) means for producing an input sinusoidal signal having a predetermined average level;
    (b) means, responsive to the input sinusoidal signal, for producing a periodic signal having an amplitude periodically greater than the predetermined level of the input sinusoidal signal for periods of time different from half the period of the sinusoidal input signal;
    (c) means for storing one bit samples representative of the amplitude of such periodic signal; and
    (d) means for reconstructing the input signal from the one bit samples stored in the storing means.

3. A digital memory system comprising:
    (a) means for producing a sinusoidal signal having a period T and having a predetermined average level;
    (b) means, responsive to the sinusoidal signal, for producing an input periodic signal having an amplitude periodically greater than the predetermined average level of the sinusoidal signal for periods of time different from T/2;
    (c) means for storing a sequence of logical signals having a first state representative of the amplitude of such input periodic signal when the amplitude of such input periodic signal is greater than the predetermined level and having a second state when the amplitude of the input periodic signal is less than the predetermined level; and
    (d) means for reconstructing the sinusoidal signal from the sequence of samples stored in the storing means.

\* \* \* \* \*